(12) United States Patent
Weng et al.

(10) Patent No.: US 6,487,094 B1
(45) Date of Patent: Nov. 26, 2002

(54) HIGH EFFICIENCY DC-DC POWER CONVERTER

(75) Inventors: DaFeng Weng, San Jose, CA (US); Jinrong Qian, Plano, TX (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/974,479

(22) Filed: Oct. 10, 2001

(Under 37 CFR 1.47)

(51) Int. Cl.[7] ............................................. H02M 3/335
(52) U.S. Cl. ............................. 363/21.12; 363/56.01; 363/97
(58) Field of Search ........................ 363/16, 20, 21.01, 363/21.02, 21.04, 21.12–21.18, 56.01, 56.09, 56.12, 97, 127, 131

(56) References Cited

U.S. PATENT DOCUMENTS

| | | | |
|---|---|---|---|
| 5,673,185 A | 9/1997 | Albach et al. | 363/45 |
| 5,694,302 A | 12/1997 | Faulk | 363/16 |
| 5,748,457 A * | 5/1998 | Poon et al. | 363/16 |
| 6,188,592 B1 * | 2/2001 | Farrington et al. | 363/127 X |
| 6,314,002 B1 * | 11/2001 | Qian et al. | 363/21.04 |

* cited by examiner

Primary Examiner—Jessica Han

(57) ABSTRACT

A DC-DC power converter in which the voltage across the main switch due to leakage inductance of the transformer is clamped and leakage energy of the transformer is recycled instead of being dissipated so as to improve operating efficiency.

8 Claims, 2 Drawing Sheets

HIGH EFFICIENCY DC-DC POWER CONVERTER

BACKGROUND OF INVENTION

1. Field of the Invention

The invention relates to a DC-DC power converter. More specifically, the invention relates to a converter in which the voltage across the main switch due to the leakage inductance of the transformer is clamped and the leakage energy of the transformer is recycled instead of being is dissipated by the circuit so as to improve the circuit efficiency.

2. Description of Related Art

A well-known conventional DC/DC flyback converter is shown in FIG. 1, where Lk 10 is the leakage inductance of the transformer T 12. The typical switching waveforms of FIG. 1 are shown in FIG. 2. When switch S 14 is turned off at t2, the leakage current charges the parasitic output capacitance of switch S 14 (output capacitance of S is not shown in FIG. 1), which causes a high voltage spike across switch S 14. After the leakage energy is completely released, the voltage across switch S 14 reaches its steady-state value. As a result, a high voltage rating for switch S 14 is required.

To eliminate this voltage spike, a number of circuit topologies have been reported in the literature. Among them, the R-C-D snubber, shown in FIG. 3 is one of the most popular ways to minimize the voltage spike as shown in FIG. 2. The snubber circuit consists of diode D1 20, capacitor Cs 22 and resistor Rs 24. When switch S 14 is turned off, the leakage current flows through diode D1 20 and charges capacitance Cs 22. If capacitance Cs 22 is relatively large, the voltage across Cs 22 does not change so as to clamp the voltage. In this case, the leakage energy of the transformer is first charged to Cs 22 and then is dissipated by the resistor Rs 24. As a result, the voltage clamp is achieved at the expense of low conversion efficiency.

SUMMARY OF THE INVENTION

The invention is a DC-DC converter in which the voltage across the main switch due to the leakage inductance of the transformer is clamped and the leakage energy of the transformer is recycled instead of being dissipated by the circuit so as to improve the circuit efficiency. The DC-DC converter has a voltage source which is connected to a diode. A first transformer primary winding is in series with a first capacitor. This winding and capacitor are connected across the voltage source and diode. A second transformer primary winding is in series with a second capacitor. They are also connected across the voltage source and diode. The first and second transformer primary windings have first and second leakage inductances respectively.

A switch has one terminal connected to terminals of the first transformer primary winding and the first capacitor. The switch also has a second terminal connected to the terminals of the second transformer primary winding and the second capacitor. The transformer first and second primary windings and the transformer secondary winding are included in the transformer. The transformer has a magnetizing inductance providing a delivered output to the transformer secondary winding. A parallel load capacitor and load resistor are connected across the transformer secondary winding and diode.

The advantage of the inventive DC-DC converter is that the voltage across the main switch due to the leakage inductance of the transformer is clamped. In addition, the leakage energy of the transformer is recovered by charging the first and second capacitors and the delivered output by the magnetizing inductance instead of being dissipated by the circuit so as to improve the circuit efficiency. Another objective of the invention is to use as few components as possible and use only one active switch to reduce the cost.

DESCRIPTION OF THE PREFERRED EMBODIMENT

Figure 1:
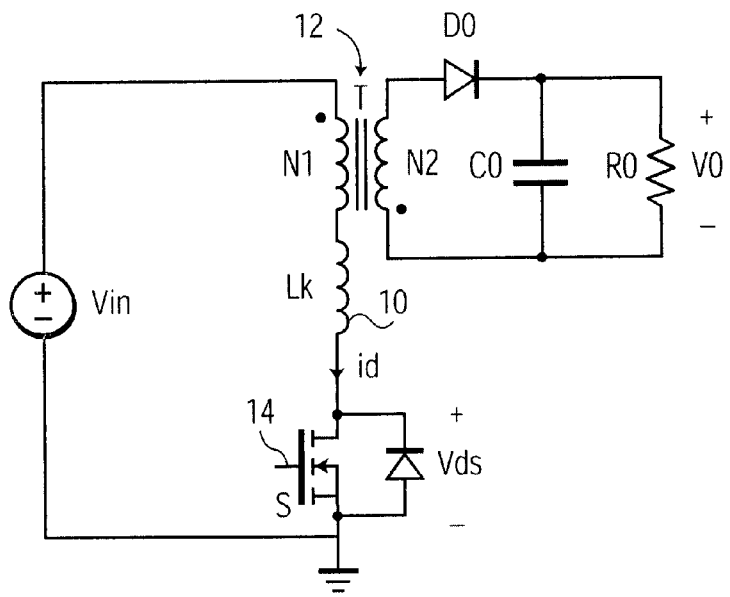
FIG. 1 shows a schematic drawing of a conventional DC-DC flyback converter (prior art).
Figure 2:
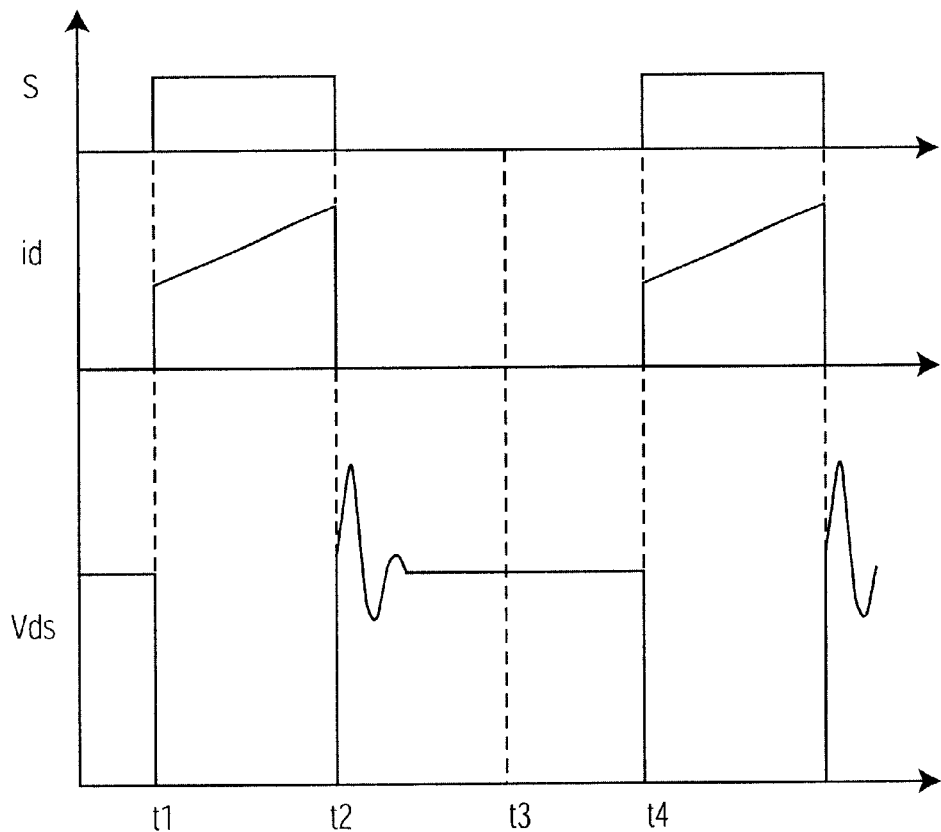
FIG. 2 shows the switching waveforms of FIG. 1.
Figure 3:
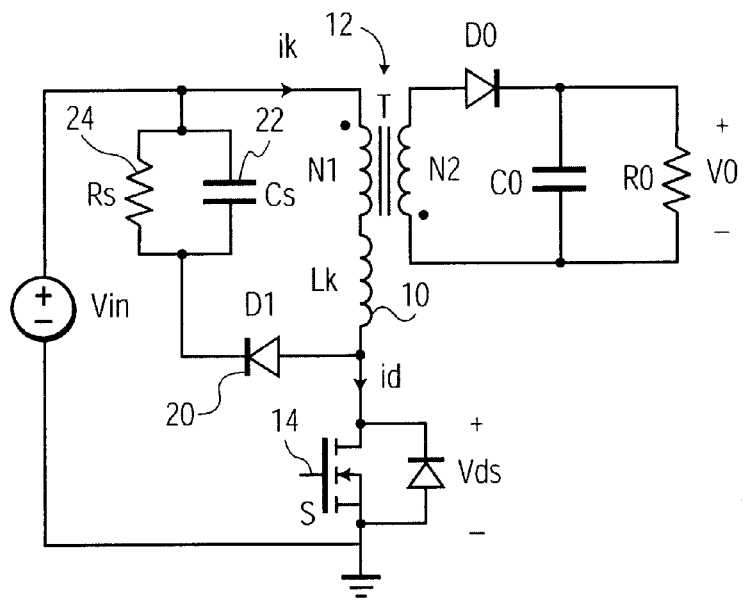
FIG. 3 shows a detailed schematic drawing of a DC-DC flyback converter with R-C-D Snubber (prior art).
Figure 4:
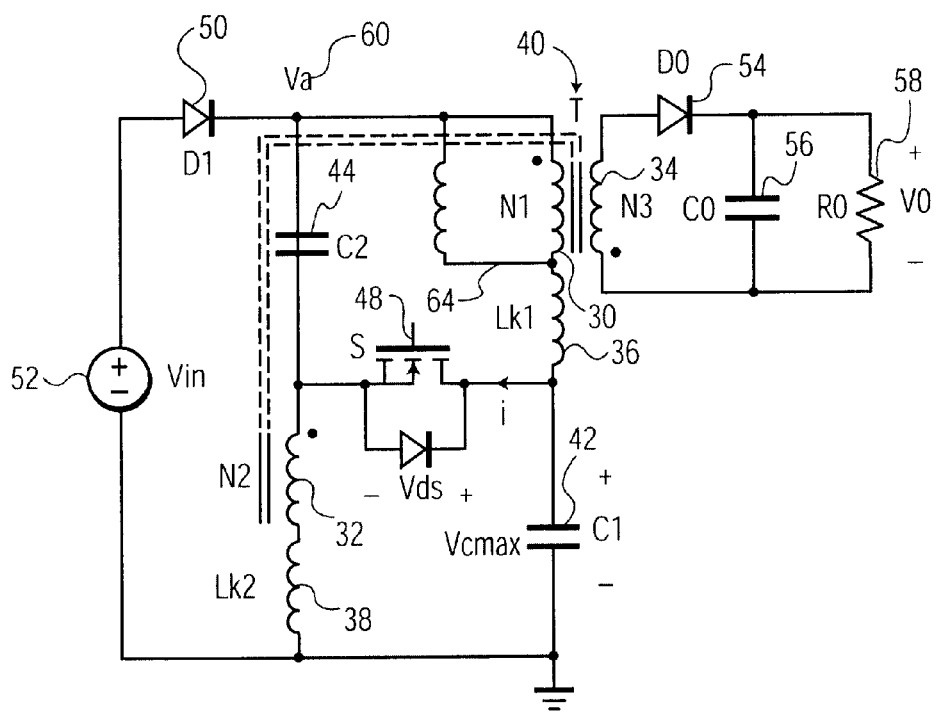
FIG. 4 shows a detailed schematic drawing of the invented DC-DC converter with leakage energy recovery of the transformer.

The inventive circuit is shown in FIG. 4. The transformer T 40 has two primary windings (i.e. first and second) N1 30 and N2 32, respectively, and one (i.e. first) secondary winding N3 34. The windings N1 30 and N2 32 have the same number of turns. LK1 36 and LK2 38 (LK1=LK2) are the first and second leakage inductances, respectively, of two primary windings N1 30 and N2 32 in transformer T 40. First and second capacitors C1 42 and C2 44, respectively, (C1=C2) are the clamp capacitors to clamp the voltage across switch S 48 during the switch off period. Switch S 48 is a power semiconductor switch which for example could be a MOSFET or an insulated gate bipolar transistor (IGBT). First diode D1 50 is in series with power source 52 to block the reverse energy to the source when C1 42 and C2 44 release the leakage energy to the load through the transformer 40. Second diode Do 54 is the output rectifier and capacitor Co 56 is the filter capacitor to reduce the output voltage ripple. Resistor Ro 58 with voltage Vo across it represents the load on the converter.

Before the switch S 48 is on, C1 42 and C2 44 are charged to a high voltage value Vcmax by the magnetizing current.

As the switch S 48 turns on, capacitors C1 42 and C2 44 are in series, and two primary windings N1 30 and N2 32 are in series through switch S 48. The voltage Va 60 is higher than the input voltage source Vin 52, and diode D1 50 is off. The voltages across capacitors C1 42 and C2 44 are applied to the windings N2 32 and N1 30 respectively. The energy stored in capacitors C1 42 and C2 44 is delivered to magnetizing inductance Lm 64. As a result, the magnetizing current increases and the voltages across C1 42 and C2 44 decrease in a resonant form, until the voltage Va 60 is equal to the input voltage 52, and D1 50 is conducting when the voltage Va 60 is clamping to the input voltage 52. The capacitors C1 42 and C2 44 provide the energy to the magnetizing inductance Lm 64 during these time intervals. The transformer is modeled as a magnetizing inductance Lm 64 with an ideal transformer with coupled windings N1, N2 and N3 in this figure. The magnetizing inductance Lm 64 is shown in parallel with primary winding N1 30. The magnetizing inductance Lm 64 could be reflected to winding N2 32 with the same value if N1=N2 because they are coupled. The power is delivered to the output through the magnetiz ing inductance to the secondary side because the magnetizing inductance Lm 64 can also be reflected to the secondary winding (i.e. N3 34) which is connected to the load 58 through the output diode 54.

The inout voltage Vin 52 is applied to the windings N1 30 and N2 32 through switch S 48. The current in the magnetizing inductor Lm 64 increases linearly, and the voltages across C1 and C2 are clamping to half of Vin. Therefore, the input power source provides the energy to the magnetizing inductor Lm 64 during this period.

When the switch S 48 turns off, the transformer's magnetizing current is first to charge capacitors C1 42 and C2 44. After the voltages across C1 42 and C2 44 are higher than Vx (where Vx=Vin+N1/N3×Vo), Do begins to conduct. The magnetizing energy stored in the transformer is then transferred to the output and the magnetizing current linearly decreases. Meanwhile, the energy stored in leakage inductance Lk1 36 and Lk2 38 is transferred to capacitors C1 42 and C2 44 instead of being dissipated by the circuit in prior arts. As the currents in Lk1 36 and Lk2 38 decrease to zero, the voltages on C1 42 and C2 44 reach the maximum value, Vcmax, where $$V_{cmax} = V_{in} + \frac{N1}{N3} \cdot V_0 + I_{kp}\sqrt{L_{k1}/C_1}$$

where $I_{kp}$ is the peak current in the leakage inductor Lk1 36 or Lk2 38 when switch S 48 turns off.

The maximum voltage across switch S 48 is:

$$V_{dsmax} = V_{in} + \frac{N1+N2}{N3} \cdot V_0 + I_{kp}\sqrt{L_{k1}/C_1}$$

It is shown that the leakage energy is full recovered and directly transferred to the load, instead of being dissipated by the circuit compared with the circuits in the prior art. As a result the invented circuit has potential high power conversion efficiency and low cost.

Another advantage is that the voltage across the main switch due to the leakage inductance of the transformer is clamped. Still another advantage is that the circuit uses only one active switch and only a few components.

While the preferred embodiments of the invention have been shown and described; numerous variations and alternative embodiments will occur to those skilled in the art. Accordingly, it is intended that the invention be limited only in terms of the appended claims.

We claim:

1. A DC-DC converter comprising,
a voltage source cooperating with a first diode;
a transformer comprising first and second primary windings and a secondary winding;
said first primary winding being in series with a first capacitor, said first primary winding and said first capacitor being connected across said voltage source and said first diode, said first primary winding having a first leakage inductance;
said transformer primary winding being in series with a second capacitor, said second primary winding and said second capacitor being connected across said voltage source and said first diode, said second primary winding having a second leakage inductance;
a switch having a first terminal connected to terminals of said first primary winding and said first capacitor, said switch having a second terminal connected to terminals of said second primary winding and said second capacitor;
said transformer having a magnetizing inductance providing a delivered output to said secondary winding, wherein the voltage across the switch due to leakage inductance of the transformer is clamped and the leakage energy of the transformer is recovered by charging said first and second capacitors and said delivered output by said magnetizing inductance instead of being dissipated so as to improve the circuit efficiency.

2. The DC-DC converter of claim 1 in which sail magnetizing inductance is in parallel with one of said transformer windings.

3. The DC-DC converter of claim 1 in which said magnetizing inductance is in parallel with said first primary winding.

4. The DC-DC converter of claim 1 in which said secondary winding is in series with a second diode.

5. The DC-DC converter of claim 4 having a parallel filter capacitor and load connected across said secondary winding and said second diode.

6. The DC-DC converter of claim 1 in which said switch is a power semiconductor switch.

7. The DC-DC converter of claim 6 in which said power semiconductor switch is a MOSFET.

8. The DC-DC converter of claim 6 in which said power semiconductor switch is an insulated gate bipolar transistor (IGBT).

* * * * *